(12) United States Patent
Sakamoto et al.

(10) Patent No.: US 6,341,541 B1
(45) Date of Patent: Jan. 29, 2002

(54) POWER TRANSMISSION SYSTEM OF AN AUTOMOBILE

(75) Inventors: Hiroshi Sakamoto, Hitachi; Toshimichi Minowa, Mito; Mitsuo Kayano, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/556,626

(22) Filed: Apr. 21, 2000

(30) Foreign Application Priority Data

Apr. 21, 1999 (JP) .......................................... 11-113184

(51) Int. Cl.⁷ .............................................. F16H 37/06
(52) U.S. Cl. .................................. 74/665 A; 74/665 B
(58) Field of Search ............................. 74/665 A, 665 B

(56) References Cited

U.S. PATENT DOCUMENTS 4,411,171 A * 10/1983 Fiala ............................ 74/675
6,024,667 A * 2/2000 Krohm et al. ................. 477/6

* cited by examiner

*Primary Examiner*—Dirk Wright
(74) *Attorney, Agent, or Firm*—Crowell & Moring LLP

(57) ABSTRACT

The power transmission of the car comprises an engine, a gearbox, a rotary electric unit which transmits power through the gearbox, and a clutch which is provided between the input shaft and the output shaft of said gearbox to control the torque between the input shaft and the output shaft.

5 Claims, 7 Drawing Sheets

FIG. 2

| NO. | MODE | SYSTEM STATUS | CLUTCH STATUS | MULTIPLE DISK CLUTCH | DOG CLUTCH FOR SPEED CHANGE | DOG CLUTCH FOR MOTOR GENERATOR | REMARKS |
|---|---|---|---|---|---|---|---|
| 1 | STOP | IDLING AND POWER | ON | OFF | N | ON | ENGINE START |
| 2 | MOTOR GENERATOR RUN | GENERATING | OFF | OFF | 1st | ON | |
| 3 | | REVERSING | OFF | OFF | 1st | ON | REVERSE ROTATION REGENERATING BRAKE |
| 4 | | LOW SPEED (FIRST) | OFF | OFF | 1st | ON | |
| 5 | | INTERMEDIATE SPEED (SECOND) | OFF | OFF | 2nd | ON | |
| 6 | | HIGH SPEED (THIRD) | OFF | ON | N | ON | |
| 7 | ENGINE RUN | LOW SPEED (FIRST) | ON | OFF | 1st | OFF | |
| 8 | | | ON | OFF | 1st | ON | ASSISTING POWER GENERATION |
| 9 | | INTERMEDIATE SPEED (SECOND) | ON | OFF | 2nd | OFF | |
| 10 | | | ON | OFF | 2nd | ON | ASSISTING POWER GENERATION |
| 11 | | HIGH SPEED (THIRD) | ON | ON | N | OFF | |
| 12 | | | ON | ON | N | ON | ASSISTING POWER GENERATION |

TOQUE TRANSMISSION ROUTE

TOQUE TRANSMISSION ROUTE

POWER TRANSMISSION SYSTEM OF AN AUTOMOBILE

BACKGROUND OF THE INVENTION

1. Field of the Invention

The present invention relates to a structure of a power train system comprising an engine, a rotary electric unit and a gearbox and more particularly to a power transmission system for increasing a power transmission efficiency in the power train system. (In this specification, we define the rotary electric unit as an electric motor when it is mainly used to drive, a generator when it is used to generate electric power and start the engine, or a motor generator when it is used to generate electric power as often as to drive.)

2. Related Background Art

From the viewpoint of global ecology, the world has been carefully watching the development of a hybrid car control system which is assumed to drastically reduce the fuel ratio.

Japanese Non-examined Patent Publication No. 10-217779 (1998) has disclosed a unified hybrid power transmission system comprising one rotary electric unit, a reduction gear mechanism, and a clutch mechanism.

In this publication, a power transmission system houses a rotary electric unit and a clutch mechanism in its casing to make the power train system compact and light-weighted.

By always joining together the input shaft of said gearbox and said rotary electric unit, the power transmission system can cause the engine to drive only said rotary electric unit to generate electric power and use part of the generated power to cause the other rotary electric unit to run. This is what is called a series hybrid driving mechanism.

This hybrid power transmission system totally controls the engine and the rotary electric unit so as to give a satisfactory acceleration/deceleration feeling to the driver and run the engine and the rotary electric unit at a high efficiency.

Said unified hybrid power transmission system disclosed in Japanese Non-examined Patent Publication No. 10-217779 (1998) has problems as stated below.

The first problem is that the rotary electric unit must be provided closer to the driving shaft (rather than to the reduction gear mechanism) to reduce torque shocks caused by changes of reduction gears (e.g. from First to Second gear positions and Second to Third gear positions). However, to generate electric power by the driving force of the engine in the series hybrid mode, the rotary electric unit must be provided closer to the engine (rather than to the rotary electric unit). Therefore, to increase the speed change performance while reducing reduce torque shocks caused by gear changes, said system must be equipped with at least two rotary electric units, which makes the system greater.

The second problem is that the mechanism for transmitting the drive (torque) from the output shaft of the engine to the output shaft of the rotary electric unit is very complicated and consequently it has a low torque transmission efficiency.

The third problem is that the inertia torque of the revolving shaft of the rotary electric unit works on the engine as a load as said unified hybrid power transmission system houses the engine and the rotary electric unit in a body. Therefore, when the system tries to accomplish an acceleration command made by the driver, the engine must generate a torque required for the acceleration command and a torque enough to cancel said inertia torque. Consequently, the fuel ratio goes lower when the drivability is increased.

SUMMARY OF THE INVENTION

Judging from the above problems, an object of the present invention is to provide a power transmission system comprising a reduction gear mechanism housing, a rotary electric unit and clutch mechanism which cab be increase the efficiency of the power transmission, reduce the fuel ratio of the car, and make the driving system more compact.

The aforesaid problems can be accomplished by improving the reduction gear mechanism by the invention disclosed below.

The first one of said problems can be effectively solved by providing a mechanism which mechanically absorbs the gear change shock instead of using an electric driving force such as a rotary electric unit. In other words, the present invention is a power transmission system for an automobile comprising an engine, a gearbox placed between said engine and a driving shaft, a rotary electric unit connected to the output shaft of said engine and to said driving shaft through said gearbox, and a clutch placed between the input shaft of said transmission unit and the output shaft to control the transmission torque from the output shaft to the input shaft. This clutch can absorb gear change shocks without any rotary electric unit near the driving shaft.

Preferentially, said clutch is a power gearbox of a car which is mounted on a gear of the minimum gear ratio (on a HIGH gear) in said reduction gear. In other words, the clutch mounted on the HIGH gear side can handle any rotational change before and after gear changes.

Further, the second one of said problems can be effectively solved by a technique disclosed below. Usually, a hybrid car stops the engine when the car stops and restarts the engine by the rotary electric unit when the car starts to run to increase the fuel ratio of the engine. In this case, it is more effective to reduce the revolution of the gearbox by the gearbox and transmit it to the engine shaft instead of directly transmitting the revolution of the gearbox to the engine shaft. In other words, the system in accordance with the present invention is a power transmission system of an automobile comprising an engine, a gearbox placed between said engine and a driving shaft, and a rotary electric unit connected to the output shaft of said engine and to said driving shaft through said gearbox, wherein the drive (rotation) of the output shaft of said rotary electric unit is reduced and transmitted to the input shaft of said gearbox in the side facing to the engine.

Further, it is effective to reduce the number of transmission mechanisms such as gears which transmit the drive of the engine to the rotary electric unit when driving the rotary electric unit by the drive of the engine to generate electric power. In other words, the system in accordance with the present invention is a power transmission system of an automobile comprising an engine, a gearbox placed between said engine and a driving shaft, and a rotary electric unit connected to the output shaft of said engine and to said driving shaft through said gearbox. The efficiency of power transmission can be retained by directly engaging the gear of the output shaft of the engine and the gear of the output shaft of the rotary electric unit (without any gear between said gears).

Further the system is preferentially equipped with a clutch which disconnects the output shaft of said rotary electric unit from the input shaft of said gearbox (closer to said rotary electric unit. As this clutch disconnects the engine from the rotary electric unit and prevents the inertia torque of the rotary electric unit from giving a load to the engine. Thus the third one of said problems can be solved.

According to the present invention, a clutch mechanism provided to join together and disconnect the input shaft and the output shaft of the gearbox can absorb gear-change shocks which generate in speed changes without adding a rotary electric unit closer to the axle that to the gearbox.

Further, the electric efficiency of restarting the engine can be increased by building up the system so that the drive of the output shaft of the rotary electric unit may be reduced and transmitted to the input shaft of the engine.

Furthermore, reduction in efficiency of power generation by the engine can be suppressed by direct engagement of gears of the output shaft of the engine and the output shaft of the rotary electric unit.

When equipped with a clutch which disconnects the output shaft of the rotary electric unit and the input shaft of the gearbox (in the side of the rotary electric unit), the power transmission system can disconnect the engine and the rotary electric unit to prevent the inertia torque of the rotary electric unit from acting as a load on the engine.

BRIEF DESCRIPTION OF THE DRAWINGS

FIG. 2 is a listing of running modes and operating status of clutches.

DETAILED DESCRIPTION OF PREFERRED EMBODIMENTS

A first embodiment of the present invention will be described in detail below, referring to drawings.

Figure 1:
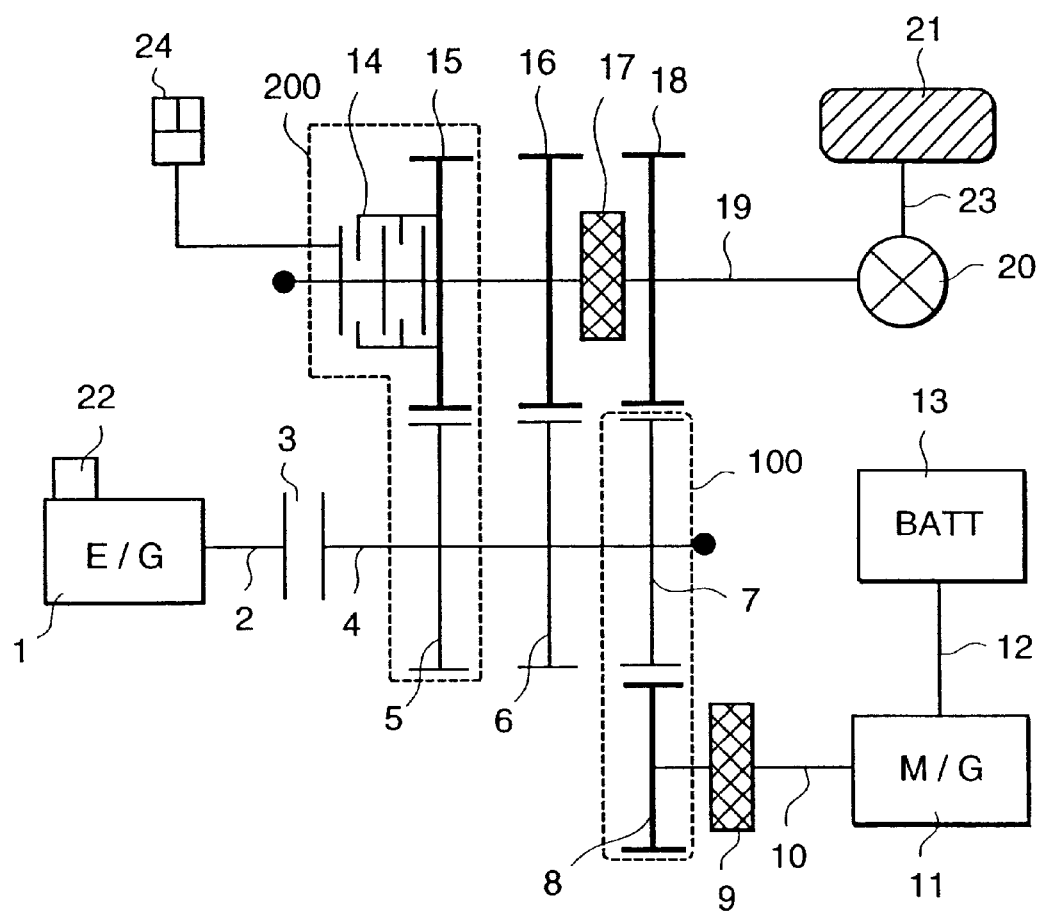
FIG. 1 is a schematic diagram of a power transmission system of a car which is a first preferred embodiment of the present invention.

FIG. 1 is a schematic diagram of a car power transmission which is the first preferred embodiment of the present invention. 1 is an engine. A motor generator 11 receives electric energy from a battery 13 and generates kinetic energy. When receiving kinetic energy from the motor generator, the motor generator 11 converts it to electric energy and stores it in a battery 13. 21 and 23 are respectively a wheel and an axle.

A driving gear wheel 5 for high speed is engaged with a driven gear wheel 15 for high speed and fixed to the input shaft 4 of the gearbox.

Similarly, a driving gear wheel 6 for low speed is engaged with a driven gear wheel 16 for low speed and fixed to the input shaft 4 of the gearbox.

Further, a driving gear wheel 7 is for intermediate speed and fixed to the input shaft 4 of the gearbox. The driving gear wheel 7 is respectively engaged with a driven gear 18 for intermediate speed and a driven gear 8 for a motor generator 11. The gears 7 and 8 are designed to have an optimum gear ratio to increase and transmit the torque from the input shaft of the gearbox to the output shaft of the motor generator.

A dog clutch 9 for the motor generator works to join together or disconnect the output shaft 10 of the motor generator and the driven gear 8. Further, a dog clutch 17 for speed change works to join together or disconnect the output shaft 19 of the gearbox and the driven gear 16 (for low speed) or 18 (for intermediate speed). Generally, these dog clutches have been well known as means to transmit the drive at high efficiency without any coupling loss. Said torque transmission mechanism is enclosed in a dotted box 100 in FIG. 1 and it comprises the driving gear 7 for intermediate speed and the driven gear 8 for the motor generator. Said clutch mechanism is the dog clutch 9 for the motor generator.

A clutch 3 for launching is used as a dry clutch which transmits the torque with the clutch disc between a flywheel and a pressure plate. It is assumed that the clutch is joined together or disconnected by an oil-pressure actuator or the like which transmits the operating force of a clutch pedal (not shown in FIG. 1)

A multiple-disc clutch 14 has a function to join together or disconnect the driving gear and the driven gear 15 (for high speed) by the oil-pressure actuator 24. As the oil-pressure actuator 24 gradually pushes the multiple-disc clutch 14 forward, the torque of the input shaft 4 of the gearbox is gradually transmitted to the output shaft 19 of the gearbox. By controlling the force of pushing the multiple-disc clutch 14 by the oil-pressure actuator 24, the rotational speed of the output shaft 19 of the gearbox can be controlled according to loads (e.g. unevenness of road). In this status, the torque of the engine is transmitted in the order of the output shaft 2 of the engine, the launching clutch 3, the input shaft 4 of the gearbox, the drive gear 5 for high speed, the multiple-disc clutch 14 for high speed, the driven gear 15 for high speed, and the output shaft 19 of the gearbox. Said power transmission mechanism is enclosed in a dotted box 200 in FIG. 1 and it comprises the driving gear 7 for intermediate speed, the driven gear 15 for high speed, and the multiple-disc clutch 14. Said control mechanism is the oil-pressure actuator.

FIG. 2 explains a basic method of controlling the transmission of torque of the engine 1 and the motor generator 11. In the first gear position, the dog clutch 17 for speed change is joined with the driven gear 16 for low speed. In the second gear position, the dog clutch 17 is joined with the driven gear for intermediate speed. In the neutral (N) position, the dog clutch 17 is disconnected from the gears.

Below will be explained a method of controlling in the Stop mode. In the idling and power-generating status (in No. 1), the launching clutch 3 is engaged (ON). The multiple-disc clutch 14 is disengaged (OFF). The dog clutch 9 for speed change is set to the N (Neutral) position. The dog clutch 9 for the motor generator is engaged. In this status, the torque from the engine 1 is transmitted to the motor generator through the driving gear 7 for intermediate speed and the driven gear 8 for the motor generator. The motor generator generates electric power while the engine is idling or while the car is not running. To run the car smoothly by the motor generator 14 from this status, the multiple-disc clutch 14 must be moved to transfer the torque from the engine 1 gradually. At the same time, the multiple-disc clutch 14 for high speed and an electronically-controlled throttle 22 of the engine 1 must be controlled together to match the revolution of the input shaft 4 of the gearbox with the revolution of the output shaft 4 of the gearbox. In this status, the dog clutch 17 for speed change is coupled to the gear in the FIRST gear position. To stop idling of the engine (in No. 2), disengage the launching clutch and shut off fuel to the engine 1. In this case, the dog clutch 17 for speed change must be in the first gear position for smooth launching. There can be three ways to launch the car: sliding the launching clutch 3 and using the torque of the engine 1, using the torque of the motor generator, and using the torque of engine 1 together with the torque of the motor generator.

Below will be explained how the motor generator 11 is used to run the car. When running back the car, disengage the launching clutch 3, engage the dog clutch 9 for the motor generator, select the driven gear 16 (for low speed), 18 (for intermediate speed) or 15 (for high speed), and turn the motor generator 11 negatively. (Note: negatively to run the car backward or positively to run the car forward) Generally, a great drive torque is required to run the car backward (in the Reverse Run status). For this purpose, it is assumed that the dog clutch 17 for speed change is set to the first gear position and the multiple-disc clutch 14 for high speed is disconnected. When running the car forward slowly (No. 4), disengage the launching clutch 3, set the dog clutch 17 for speed change to the first gear position, engage the dog clutch 9 for the motor generator, disengage the multiple-disc clutch 14, then revolve the motor generator 11 forward. Similarly, when running the car forward at an intermediate speed (No. 5), disengage the launching clutch 3, set the dog clutch 17 for speed change to the second gear position, engage the dog clutch 9 for the motor generator, and disengage the multiple-disc clutch 14. Further, when running the car forward at a high speed (No. 6), disengage the launching clutch 3, set the dog clutch 17 for speed change to the neutral (N) gear position, engage the dog clutch 9 for the motor generator, and engage the multiple-disc clutch 14. Further in the above running modes No. 3 to No. 6, as the motor generator 11 is engaged with the output shaft 19 of the gearbox, the system can regenerate energy during reduction.

Below will be explained how the engine 1 runs the car at a low speed (in the first gear position). In the running mode No. 7, engage the launching clutch 3, disengage the multiple-disc clutch 14, set the dog clutch 17 for speed change in the first gear position, and disengage the dog clutch 9 for the motor generator. With this, the engine 1 can run the car at a low speed. If the battery 13 is almost exhausted, the battery can be charged by the motor generator while the car is running by the engine 1. In this case, engage the launching clutch 3, disengage the multiple-disc clutch 14, set the dog clutch 17 for speed change in the first gear position, and engage the dog clutch 9 for the motor generator. With this, the motor generator is driven by the engine and can charge the battery. If the battery 13 is fully charged and enough strong to run the car long, the motor generator assists the engine 1 to run the car together. In the aforesaid running mode No. 8, as the motor generator 11 is engaged with the output shaft 19 of the gearbox, the system can regenerate energy during reduction.

Below will be explained how the engine 1 runs the car at an intermediate speed (in the second gear position). In the running mode No. 9, engage the launching clutch 3, disengage the multiple-disc clutch 14, set the dog clutch 17 for speed change in the second gear position, and disengage the dog clutch 9 for the motor generator. With this, the engine 1 can run the car at an intermediate speed. Similarly in the running mode No. 8, if the battery 13 is almost exhausted, the battery can be charged by the motor generator while the car is running by the engine 1. In this case, engage the launching clutch 3, disengage the multiple-disc clutch 14, set the dog clutch 17 for speed change in the second gear position, and engage the dog clutch 9 for the motor generator. With this, the motor generator is driven by the engine and can charge the battery. If the battery 13 is fully charged and enough strong to run the car long, the motor generator assists the engine 1 to run the car together. In the aforesaid running mode No. 8, as the motor generator 11 is engaged with the output shaft 19 of the gearbox, the system can regenerate energy during reduction.

Below will be explained how the engine 1 runs the car at a high speed (in the third gear position). In the running mode No. 11, engage the launching clutch 3, engage the multiple-disc clutch 14, set the dog clutch 17 for speed change in the neutral (N) gear position, and disengage the dog clutch 9 for the motor generator. With this, the engine 1 can run the car at a high speed. If the battery 13 is almost exhausted (as well as in the running modes No. 8 and No. 10), the battery can be charged by the motor generator while the car is running by the engine 1. In this case, engage the launching clutch 3, engage the multiple-disc clutch 14, set the dog clutch 17 for speed change in the neutral (N) gear position, and engage the dog clutch 9 for the motor generator (No. 12). With this, the motor generator is driven by the engine and can charge the battery. If the battery 13 is fully charged and enough strong to run the car long, the motor generator assists the engine 1 to run the car together. In the aforesaid running mode No. 10, as the motor generator 11 is engaged with the output shaft 19 of the gearbox, the system can regenerate energy during reduction.

Further, the system configuration in accordance with the present invention can regenerate energy during reduction in every running mode. For example, in every running mode of No. 8, No. 10, and No. 12, match the revolution of the input shaft 4 of the gearbox with the output shaft 10 of the motor generator and engage the dog clutch 9 for the motor generator during reduction. With this, energy can be regenerated.

As the dog clutch 9 for the motor generator is also used as a starter of the engine 1, the ratio of the driving gear 7 for intermediate speed and the driven gear 8 for the motor generator must be so designed to increase and transmit torque from the input shaft 4 of the gearbox to the motor generator. This can reduce the torque of the motor generator required to start the engine, to run the car by the motor generator, and to run the car by both the engine and the motor generator as this reduces the torque of the motor generator and transmits it to the input shaft 4 of the gearbox. Consequently, the motor generator 11 can be made smaller and less weighed.

Although the embodiment disclosed by Japanese Non-examined Patent Publication No. 10-217779 (1998) has two pairs of gear trains to transmit the drive from the engine to the motor generator, the embodiment in accordance with the present invention has only one gear train. This increases the efficiency in transmitting the drive to generate electric power by the engine 1 and consequently reduces the fuel ratio.

Figure 3:
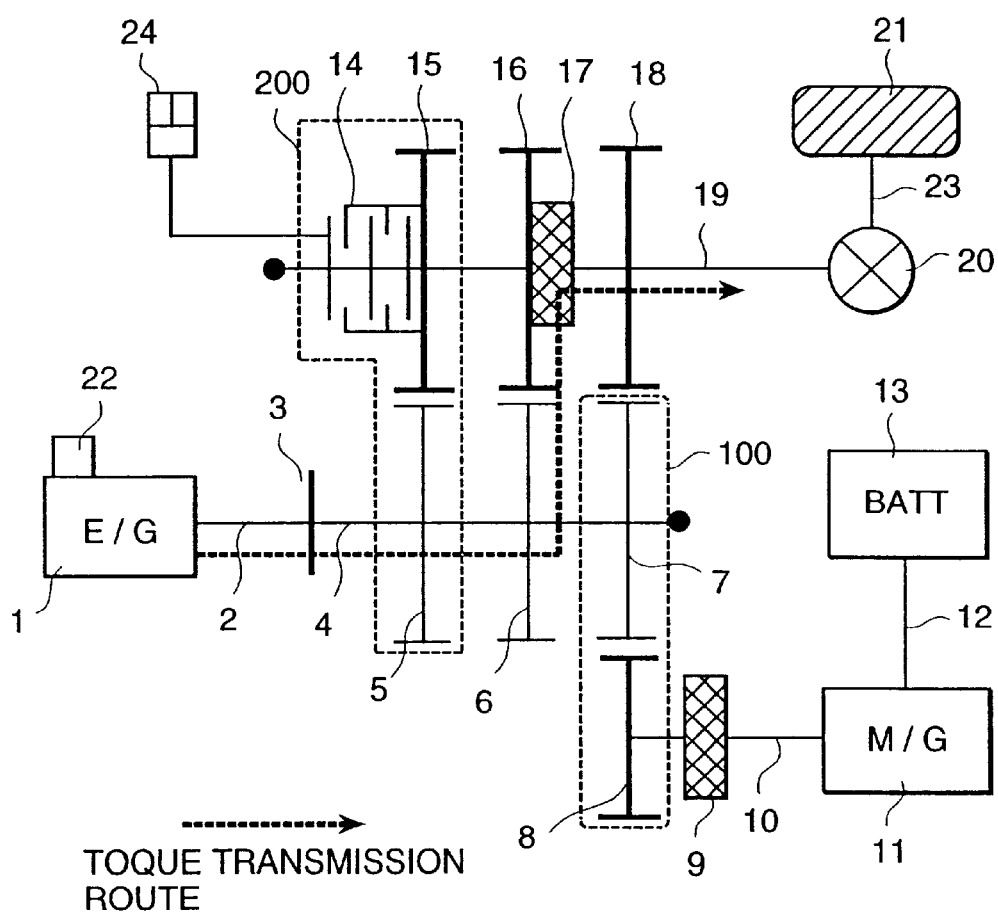
FIG. 3 is a schematic diagram of the power transmission system which is going to accelerate the car driven by the engine and shows how the torque is transmitted.

FIG. 3 is a schematic diagram of the power transmission system which is going to accelerate the car driven by the engine. The dotted arrow indicates a torque transmission route. As an example, let's assume that the launching clutch is engaged and that the dog clutch 17 for speed change is engaged with the driven gear 16 for low speed. In this status, the driving force (torque) of the engine 1 is transmitted to the output shaft 19 of the gearbox through the driving gear 16 (for low speed) and the driven gear 6 (for low speed). If the car is going to be accelerated, the motor generator 1 is disconnected from the input shaft 4 of the gearbox and the inertia torque of the motor generator can be reduced. Therefore, the torque of the engine need not be increased and thus the fuel consumption can be saved.

Figure 4:
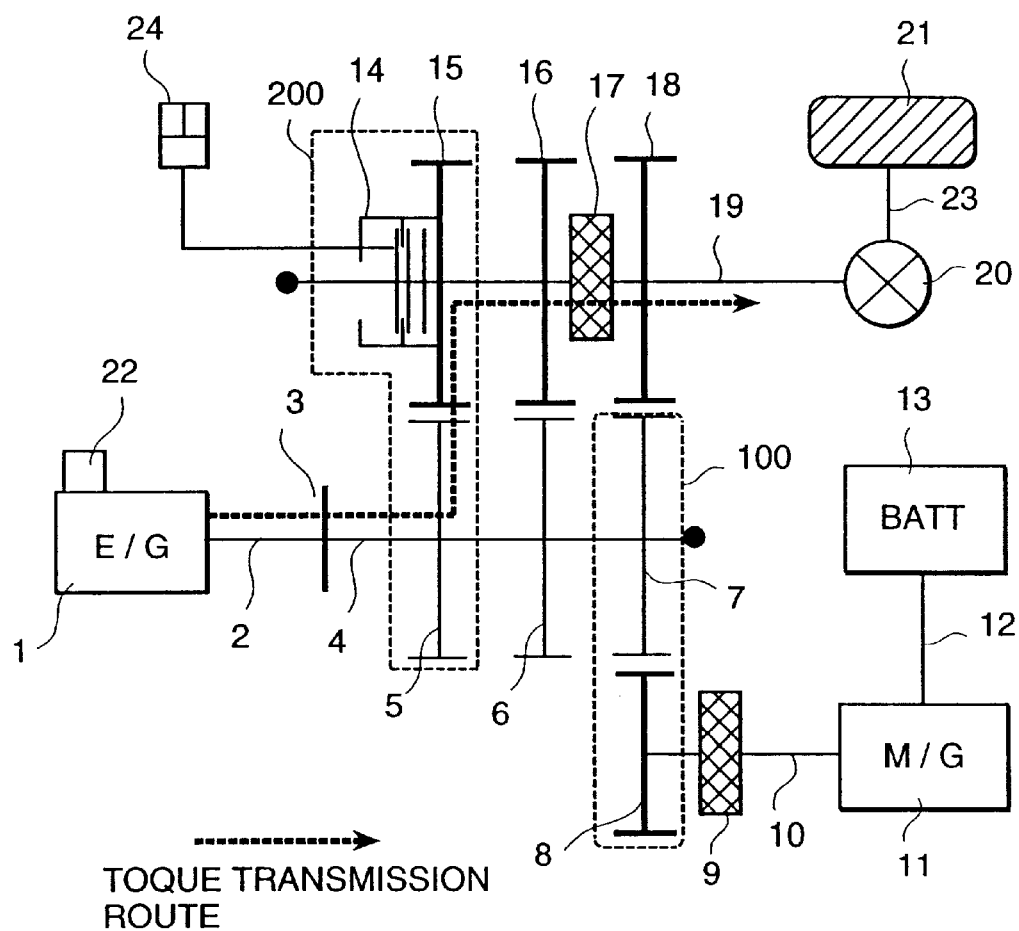
FIG. 4 is a schematic diagram of the power transmission system which is changing speeds and shows how the torque is transmitted.
Figure 5:
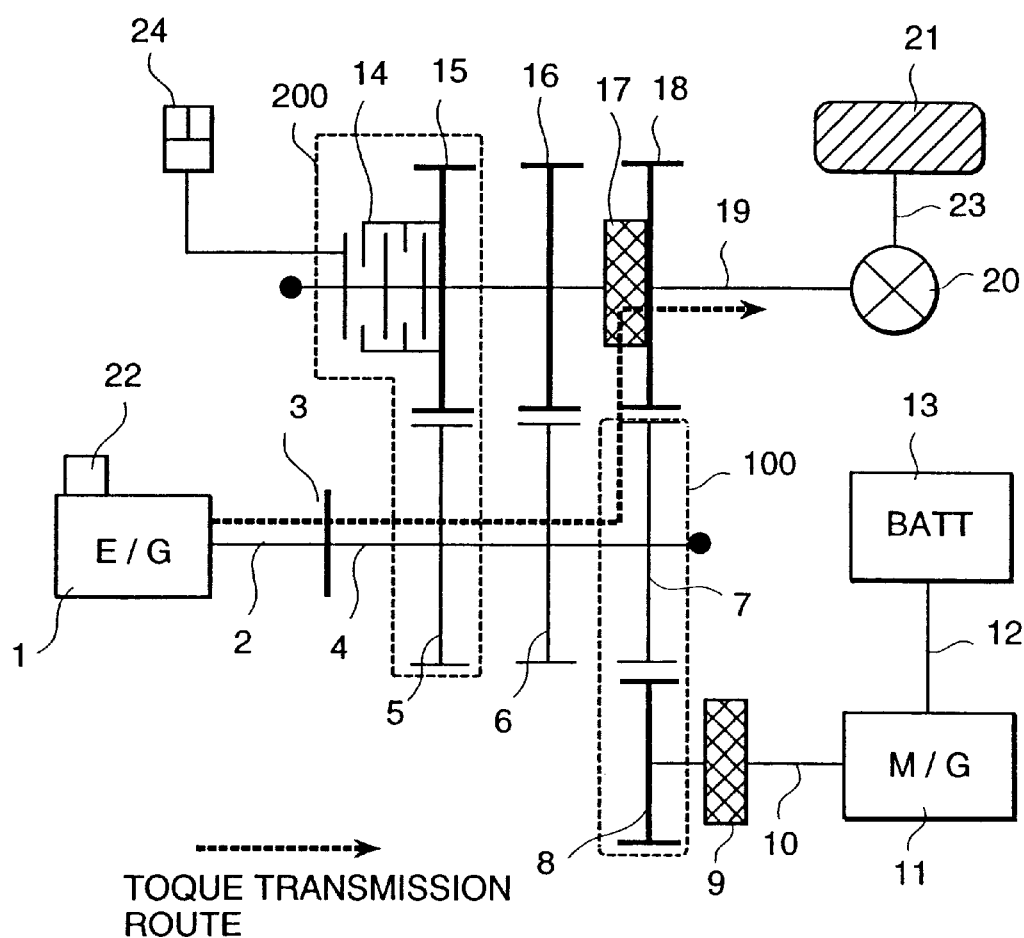
FIG. 5 is a schematic diagram of the power transmission system which has completed changing speeds and shows how the torque is transmitted.

FIG. 4 and FIG. 5 are schematic diagrams of the power transmission system which is going to accelerate from the first running status to the second running status in FIG. 3. In this status, the dog clutch 17 for speed change is disengaged and the driven gear for low speed is disengaged from the output shaft 19 of the gearbox. At the same time, the oil-pressure actuator is controlled to push the multiple-disc clutch 14 for high speed against the driven gear 15. As the result, the torque of the engine 1 is transmitted to the output shaft 19 of the gearbox through the driven gear 15 for high speed. While the multiple-disc clutch 14 for high speed is pushed against the driven gear 15, the torque of the engine is transmitted to the axle 23 and drives the wheels. At the same time, the gear ratio is very small as the driven gear for high speed is used. As the result, the load on the engine 1 becomes greater and contrarily the number of revolutions per minute becomes smaller. Finally, the gear ratio of the output shaft 9 and the input shaft 4 of the gearbox becomes smaller (from the gear ratio in the first gear position down to the gear ratio in the second gear position). In this status, the torque of the engine 1 is transmitted in the order of the output shaft 2 of the engine 1, the launching clutch 3, the input shaft 4 of the gearbox, the driving gear 5 for high peed, the multiple-disc clutch 14 for high speed, the driven gear 15 for high speed, and the output shaft 19 of the gearbox. When the gear ratio of the input shaft 4 of the gearbox and the output shaft 19 of the gearbox becomes equal to the gear ratio in the second gear position, the dog clutch 17 for the gearbox is engaged with the driven gear 18 for intermediate speed as shown in FIG. 5. The driven gear 18 for intermediate speed is engaged with the output shaft 19 of the gearbox. When the engagement is complete, the oil-pressure actuator 24 is controlled to release the multiple-disc clutch 14 and thus the gear change from the first speed to the second speed is complete. In this status, the torque of the engine is transmitted in the order of the output shaft 2 of the engine 1, the launching clutch 3, the input shaft 4 of the gearbox, the driving gear 6 for intermediate speed, the driven gear 15 for high speed, and the output shaft 19 of the gearbox. As stated above, when the speed is changed, the gear position of the gearbox changes from First to Neutral. In this status, the torque of the engine 1 is transmitted to the axle 23 through the multiple-disc clutch 14, the high-speed driving gear 5, and the high-speed driven gear 15. Therefore, the driver of the car need not release the acceleration pedal (to control the torque and the revolution of the engine 1). In this status, the driver can change speeds by the gearbox while accelerating the car. If the driver reduces the force of stepping on the acceleration pedal while the car is running or controls the electronically-controlled throttle 22 to narrow it, the revolutions of the input shaft 4 and the output shaft 19 of the gear match quicker than usual (by the multiple-disc clutch 14) (because the revolution of the engine 1 reduces quickly). This shortens the reduction time. To increase the speed to the third gear position, control the oil-pressure actuator 24 to fully push the multiple-disc clutch 14 and release the dog clutch 17 for speed change (to the neutral position). When the driver wants a greater gear ratio (to shift down), control the oil-pressure actuator 24 to adjust the pushing force of the multiple-disc clutch 14 so that the target gear ratio may be obtained. The above control during speed change can be realized also in the mode of running the car by engine 1, in the mode of running the car by engine 1 and generating power by the motor generator 11, and in the mode of running the car by the engine 1 and the motor generator 11.

Figure 6:
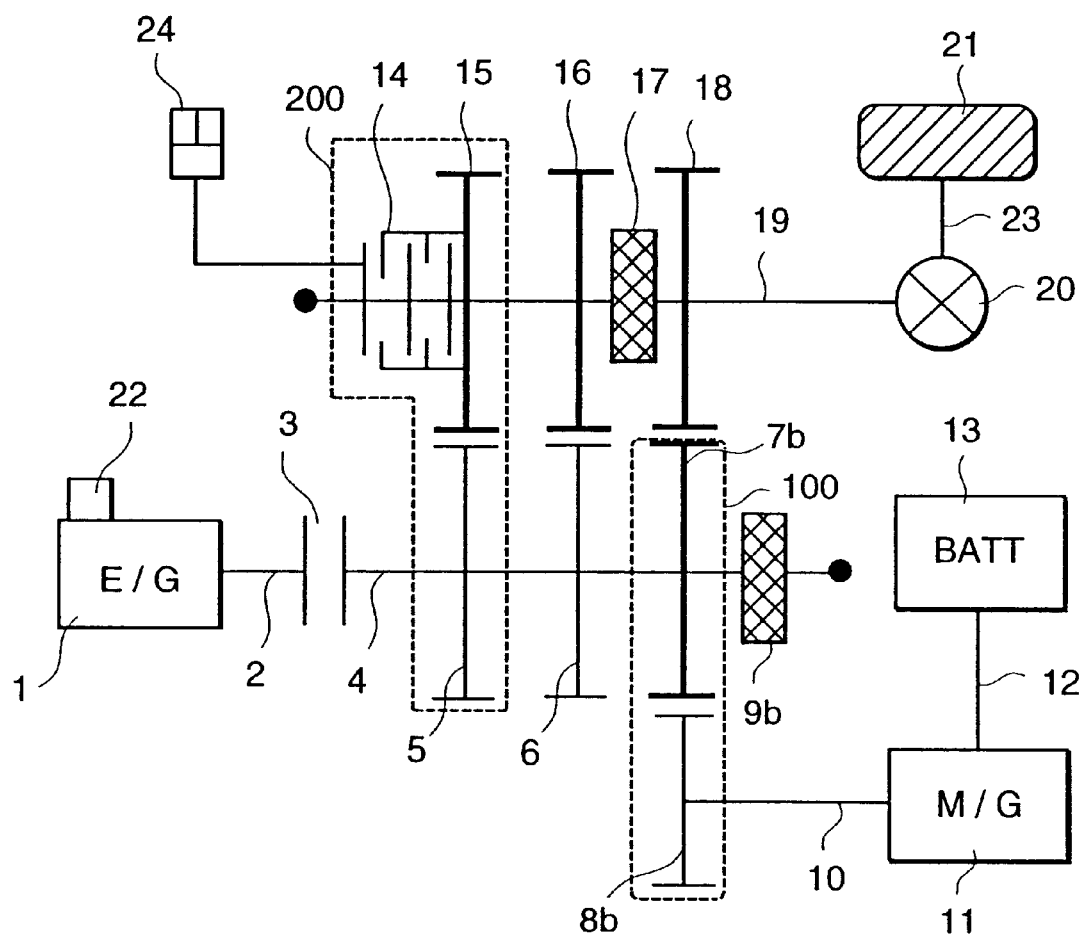
FIG. 6 is a schematic diagram of a power transmission system of a car which is a second preferred embodiment of the present invention.

FIG. 6 is a schematic diagram of the whole power transmission system which is the second embodiment of the present invention. This system in FIG. 6 is different from the power transmission system in FIG. 1 in that the dog clutch 9b for the motor generator is provided on the input shaft 4 of the gearbox, that the driving gear 7b for intermediate speed is mounted pivotally on the input shaft 4 of the gearbox, and that the driven gear 8b for the motor generator is fixed to the output shaft of the motor generator. The other components in the system have the same numbers as those in FIG. 1 and their explanations will be omitted here. Although this configuration has a demerit that the motor generator 11 also revolves when the car runs by the engine 1 (in the running mode No. 9 in FIG. 2). The motor generator 11 can be disengaged in the other Engine 1 running modes. This configuration can reduce the inertia torque of the motor generator 11 when the car is accelerated and requires no additional torque of the engine 1. This means the reduction in fuel consumption in acceleration.

Figure 7:
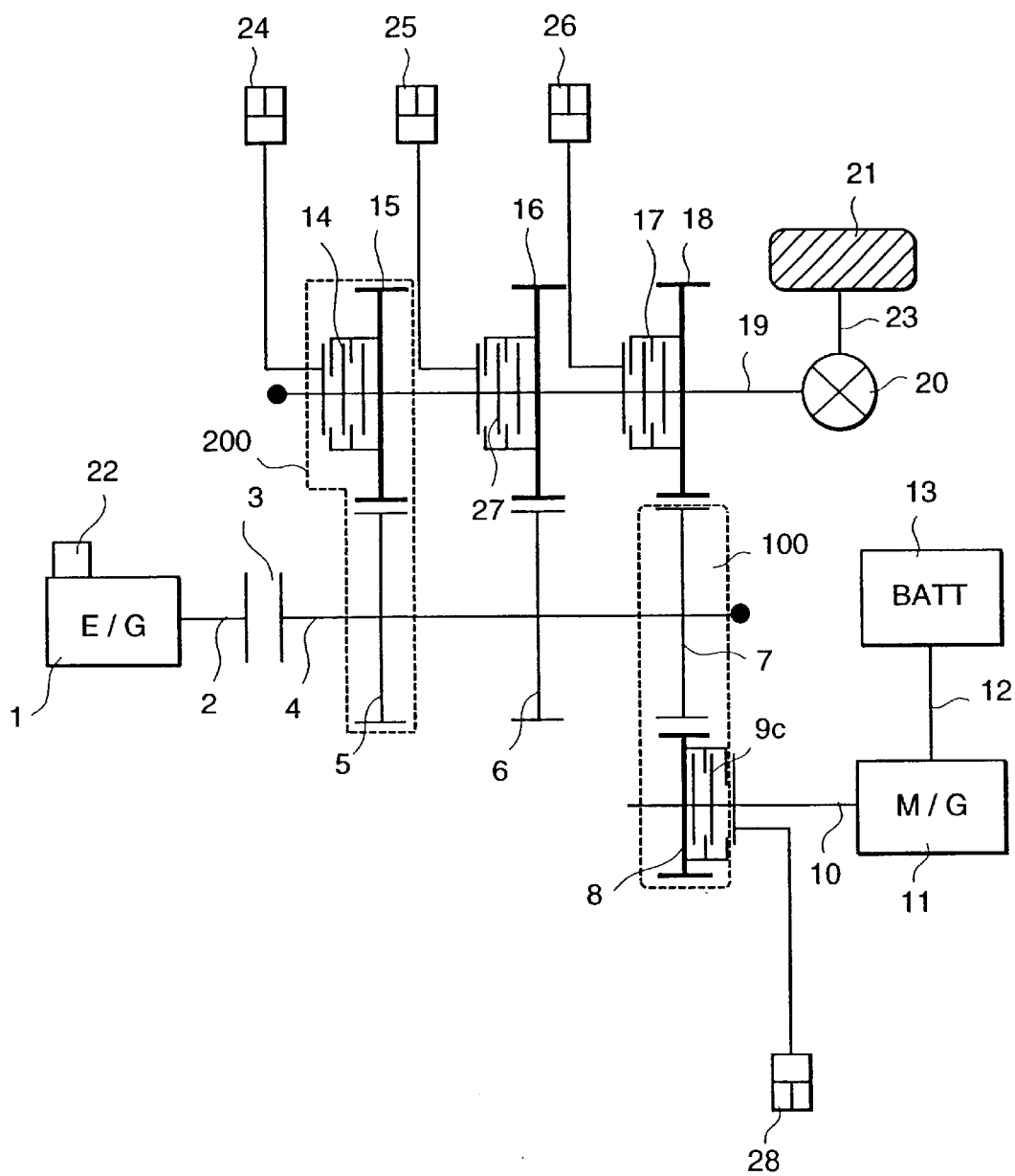
FIG. 7 is a schematic diagram of a power transmission system of a car which is a third preferred embodiment of the present invention.

This system has multiple-disc clutches 27 (for low speed) and 17c (for intermediate speed) (instead of the dog clutch 17 for speed change in FIG. 1) respectively opposite to the driven gears 16 (for low speed) and 17 (for intermediate speed) and further uses a multiple-disc clutch 9c for the motor generator instead of the dog clutch 9 for the motor generator. This system configuration can realize the same effects as those of FIG. 1 using the dog clutches 17 (for speed change) and 9 (for the motor generator). For example, when the oil-pressure actuator 25 (for low speed) is controlled to maximize the pushing force of the multiple-disc clutch 27 (for low speed), the driven gear 16 (for low speed) is engaged with the output shaft 19 of the gearbox. This status is equivalent to the status in which the dog clutch 17 (for speed change) is set to the first gear position. Similarly, when the oil-pressure actuator 26 (for intermediate speed) is controlled to maximize the pushing force of the multiple-disc clutch 17c (for intermediate speed), the driven gear 17 (for intermediate speed) is engaged with the output shaft 19 of the gearbox. This status is equivalent to the status in which the dog clutch 17 (for speed change) is set to the second gear position. Further, when the oil-pressure actuators 25 (for low speed) and 26 (for intermediate speed) are controlled to release the pushing force of the multiple-disc clutches 27 (for low speed) and 17c (for intermediate speed), you can get the status in which the dog clutch 17 (for speed change) is set in the Neutral position in FIG. 1. Similarly, when the oil-pressure actuator 28 (for motor generator) is controlled to adjust the pushing force of the multiple-disc clutch 9c (for motor generator), you can get the status in which the dog clutch 9 for the motor generator is engaged or disengaged in FIG. 1. The other components in the system (FIG. 7) have the same numbers as those in FIG. 1 and their explanations will be omitted here.

However, these examples are intended to illustrate the invention and are not to be construed to limit the scope of the invention and variations may be made by one skilled in the art without departing from the spirit and scope of the invention. For example, the engine can be either a gasoline engine or diesel engine. Further, the gear trains of said torque transmission mechanism can be substituted by a CVT, chains, or belts if it can transmit the torque. The clutch mechanism which joins together and disconnects said torque transmission mechanism and the rotary electric unit can be a wet multiple-disc clutch or an electromagnetic clutch as far as it can selectively transmit and disconnect the torque. Finally, the gearbox in accordance with the present invention can have four or more forward shifting positions and further can have an additional gear change mechanism for setting a reverse shifting position.

According to the present invention, a clutch mechanism provided to join together and disconnect the input shaft and the output shaft of the gearbox can absorb gear-change shocks which generate in speed changes without adding a rotary electric unit closer to the axle that to the gearbox.

Further, the electric efficiency of restarting the engine can be increased by building up the system so that the drive of the output shaft of the rotary electric unit may be reduced and transmitted to the input shaft of the engine.

Furthermore, reduction in efficiency of power generation by the engine can be suppressed by direct engagement of gears of the output shaft of the engine and the output shaft of the rotary electric unit.

When equipped with a clutch which disconnects the output shaft of the rotary electric unit and the input shaft of the gearbox (in the side of the rotary electric unit), the power transmission system can disconnect the engine and the rotary electric unit to prevent the inertia torque of the rotary electric unit from acting as a load on the engine.

What is claimed is:

1. A power train system of an automobile comprising an engine, a gearbox placed between said engine and a driving shaft, a rotating electric machine connected to an output shaft of said engine and to said driving shaft through said gearbox, and a clutch placed between an input shaft of said gearbox and the output shaft to control a transfer torque from the output shaft to the input shaft.

2. A power train system of an automobile in accordance with claim 1, wherein said clutch is provided on gears having the minimum gear ratio in said gearbox.

3. A power train system of an automobile, comprising an engine, a gearbox having an input shaft and an output shaft, and being placed between said engine and a driving shaft, and a rotating electric machine connected to an output shaft of said engine and to said driving shaft through said gearbox, wherein the rotation of an output shaft of said rotating electric machine is reduced and transmitted to the input shaft of said gearbox.

4. A power train system of an automobile, comprising an engine, a gearbox placed between said engine and a driving shaft, and a rotating electric machine connected to a output shaft of said engine and to said driving shaft through said gearbox, wherein the output shaft of said engine and the output shaft of said rotating electric machine are different, and the gears of said output shafts are directly engaged to transmit power.

5. A power train system of an automobile in accordance with any one of claim 1 to claim 4, wherein said machine further comprises a clutch which disconnects the output shaft of said rotating electric machine from the input shaft of said gearbox.

* * * * *